Jan. 24, 1928.
W. H. BAHAN
HUB
Filed Oct. 5, 1926
1,656,935
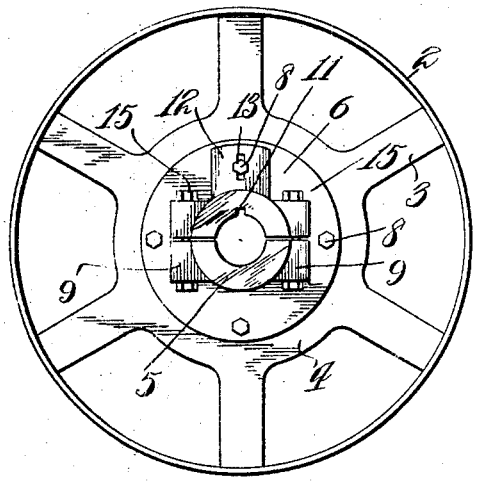
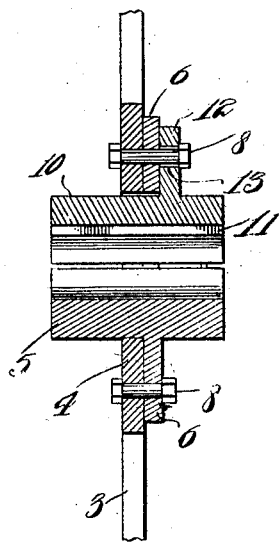
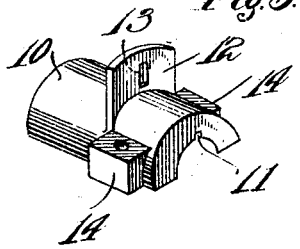
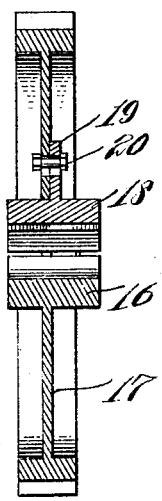
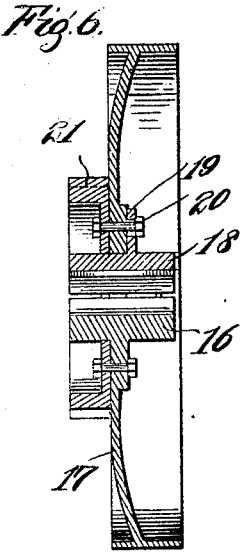
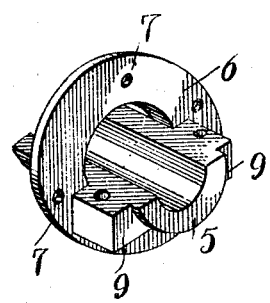
Inventor
W. H. Bahan.
By Lacy & Lacy, Attorney Patented Jan. 24, 1928.

1,656,935

UNITED STATES PATENT OFFICE.

WILLIAM H. BAHAN, OF GREENVILLE, SOUTH CAROLINA.

HUB.

Application filed October 5, 1926. Serial No. 139,739.

This invention relates to the structure of gear wheels, pulleys, brake wheels, flywheels, and other similar elements which are to be secured firmly upon a rotating shaft, and the object of the invention is to provide a simple, efficient, inexpensive and easily applied structure whereby the desired rigid connection between the wheel or pulley and the shaft will be obtained and the effects of wear may be easily overcome. The invention is illustrated in the accompanying drawing and will be hereinafter first fully described and then more particularly defined in the appended claims.

In the drawings:

Figure 1 is a side elevation of a pulley showing one embodiment of the invention.

Figure 2 is a vertical transverse section of the structure shown in Figure 1, upon a slightly enlarged scale.

Figures 3 and 4 are detail perspective views of members of the hub structure shown in Figures 1 and 2.

Figure 5 is a view similar to Figure 2, but showing another embodiment of the invention.

Figure 6 is a similar view showing a third embodiment of the invention.

In the drawing, Fig. 1 represents a pulley consisting of a rim 2, spokes 3, and a hub member 4, the hub member having a central circular opening therethrough to accommodate the rotating shaft and the securing elements which constitute the essential parts of the present invention. Referring more particularly to Figures 1, 2, 3 and 4, the structure illustrated therein embodies a semi-cylindrical sleeve or hub member 5 which is adapted to be inserted through the central opening of the hub 4 of the pulley and to fit closely to the rotating shaft. Between its ends this semi-cylindrical body 5 is provided with an external annular flange or rib 6 which is adapted to fit against the side of the pulley, as shown most clearly in Figure 2, and is provided at intervals with openings 7 therethrough to receive securing bolts 8 whereby it may be attached to the pulley. At one side of the annular flange 6, lugs or ears 9 are formed upon the body 5 to receive fastening bolts, as will be presently more specifically set forth. Mating with the semi-cylindrical body 5 is a similar semi-cylindrical body 10 which is of the same length as the member 5 and is likewise adapted to be inserted through the central opening of the pulley and to fit around the rotating shaft, the body 10, however, being provided in its bore with a longitudinal groove or key seat 11 whereby it may be keyed to the shaft so that it will rotate therewith. Between its ends, the body 10 is provided with a transverse rib or fin 12 adapted to fit against the outer face of the flange 6, as shown most clearly in Figure 2, and is provided with a radial slot 13 through which one of the securing bolts 8 may pass, the slot 13 providing for radial adjustment of the member 10 so that the proper engagement of the same with the shaft may be effected. Between the fin or rib 12 and the nearer end of the body 10, lugs or ears 14 are provided thereon, which mate with the lugs 9 upon the body 5 and through which clamping bolts 15 are inserted to clamp the two semi-cylindrical members firmly to each other and to the shaft.

It will be understood that the mating bodies 5 and 10 together constitute a hub which is clamped about the shaft and firmly secured to the pulley or wheel whereby the rotation of the shaft will be imparted to the pulley or wheel, and the structure is especially desirable for prolonging the life of a wheel or pulley which has been in use for a considerable period of time and which has become worn so that it does not fit securely upon the shaft. In applying the hub structure shown in Figures 1 to 4, and which has been described, the center opening of the pulley may be bored out so as to present a true circular surface of sufficient diameter to accommodate the hub members, and bolt holes are then formed through the hub portion of the pulley in proper relation to receive the bolts 8 by which the larger hub member is secured to the pulley. The smaller member may then be placed in proper position through the central portion of the pulley and mate with the larger member about the shaft and secured by the bolts 15 and one of the bolts 8, as shown and described. By the use of this structure, an old pulley or wheel may be rendered serviceable for an additional period and at a less cost than would be necessary to supply an entirely new pulley or wheel. In many mechanisms, a gear wheel or pulley does comparatively little work through the greater portion of its rotation while through the remaining portion of its rotation the strain thereon is concentrated and, consequently, the wear is localized and the wear-receiving portion of the gear wheel or pulley fails to operate efficiently. By employing my improved detachable hub, it is possible to shift the pulley about the shaft so that the strain will be exerted upon a different part of the pulley or gear wheel and, consequently the life of the same prolonged. To effect this adjustment, the securing elements or bolts 8 are withdrawn and the pulley then shifted about the shaft so as to bring the working tread surface of the pulley or wheel into a different relation to the hub, whereupon the securing bolts are restored and the hub secured firmly in place as before. Inasmuch as the hub will retain its original relation to the shaft, this shifting of the wheel or pulley will cause a different part of its working tread surface to be presented to the straining point in its rotation.

While the hub is especially adapted to old pulleys or wheels and is, therefore, preferably removable as an entirety therefrom, it may be applied to new wheels or pulleys in the manufacture of the same and in Figures 5 and 6, I have shown the hub as comprising the semi-cylindrical member 16 formed integral with the spokes or web 17 of a gear wheel or pulley, Figure 5 showing a gear wheel and Figure 6 showing a pulley. The web 17 in Figures 5 and 6 corresponds to the annular flange 6 of the first described form of the invention but otherwise the hub member 16 is the same in all respects as the hub member 5. The hub member 18 shown in Figures 5 and 6 corresponds in all respects to the hub member 10 previously described, the fin or rib 19 thereof fitting against the side of the web 17 and being secured thereto by a clamping bolt 20 in an obvious manner. In the form shown in Figure 5, the hub member 16 is without bolt holes corresponding to the bolt holes shown in Figure 4, but in Figure 6, such bolt holes are shown in order that a gear wheel or pinion 21 may be secured to the outer face of the web 17. In all forms of the invention, the two hub members are secured firmly together by bolts inserted through mating lugs on the hub members, the fin or rib on the removable hub member having a slot which permits the said member to be adjusted closely to the rotating shaft and also accommodate the relative sliding movement of the same when the two hub members are being clamped together.

My improved hub is obviously simple in its construction and may be produced and installed at a slight cost. The improved hub permits the pulley or gear wheel to be quickly and rigidly secured to a shaft at any desired point in the length of the shaft and, when applied, the gear wheel or pulley will be rigid with respect to the shaft.

Having thus described the invention, what I claim is:

1. A hub structure comprising mating semi-cylindrical members adapted to encircle a shaft, means for securing the members together about a shaft, an annulus on one member between the ends thereof and a radial rib on the other member between the ends thereof adapted to be secured to a side of the annulus.

2. A hub structure comprising a semi-cylindrical hub member provided between its ends with an annular flange adapted to be secured to one side of an element to be rotated by a shaft, said hub member being further provided at one side of said flange with laterally projecting lugs, a second semi-cylindrical hub member provided near one end with laterally projecting lugs mating with the lugs on the first mentioned hub member and being further provided with a radial rib bearing against the outer side of the annular flange on the first mentioned hub member, said rib having a radial slot formed therethrough and the second-mentioned hub member being provided in its bore with a longitudinal keyway, fastening devices inserted through said lugs to secure the hub members to each other and about a shaft, and other fastening devices inserted through said annular flange into the element to be rotated, one of said fastening devices being also inserted through the radial slot in the radially extending rib.

In testimony whereof I affix my signature.

WILLIAM H. BAHAN